US012599239B2

(12) United States Patent (10) Patent No.: US 12,599,239 B2
Tai (45) Date of Patent: Apr. 14, 2026

(54) CHAIR-BACK ADJUSTING STRUCTURE

(71) Applicant: GENG TONG CO., LTD., Taichung City (TW)

(72) Inventor: Chi-Lun Tai, Taichung City (TW)

(73) Assignee: GENG TONG CO., LTD., Taichung City (TW)

( * ) Notice: Subject to any disclaimer, the term of this patent is extended or adjusted under 35 U.S.C. 154(b) by 128 days.

(21) Appl. No.: 18/822,502

(22) Filed: Sep. 3, 2024

(65) Prior Publication Data

US 2026/0060430 A1     Mar. 5, 2026

(51) Int. Cl.
*A47C 7/40*          (2006.01)
*B60N 2/821*        (2018.01)

(52) U.S. Cl.
CPC .............. *A47C 7/402* (2013.01); *B60N 2/821* (2018.02)

(58) Field of Classification Search
CPC ........ B60N 2/821; B60N 2/824; B60N 2/826; A47C 7/402; A47C 7/405
See application file for complete search history.

(56) References Cited

U.S. PATENT DOCUMENTS

| | | | | |
|---|---|---|---|---|
| 4,639,041 | A * | 1/1987 | Furukawa .............. | B60N 2/826 |
| | | | | 297/391 |
| 5,356,201 | A * | 10/1994 | Olson ..................... | B63B 29/04 |
| | | | | 297/352 |
| 7,134,717 | B2 * | 11/2006 | Thunnissen ............ | B60N 2/888 |
| | | | | 297/216.12 |
| 7,543,888 | B2 * | 6/2009 | Kuno ................. | B60N 2/02246 |
| | | | | 297/391 |
| 7,600,818 | B2 * | 10/2009 | Ebbeskotte ............ | B60N 2/815 |
| | | | | 297/391 |
| 10,362,877 | B2 * | 7/2019 | Binfare .................. | A47C 17/12 |
| 10,595,642 | B2 * | 3/2020 | Liu ........................ | B60N 2/829 |
| 10,611,283 | B2 * | 4/2020 | Suarez .................. | B60N 2/832 |
| 10,856,665 | B2 * | 12/2020 | Hesse .................... | B60N 2/829 |
| 2017/0127844 | A1 * | 5/2017 | Grone .................... | A47C 7/402 |
| 2020/0015594 | A1 * | 1/2020 | Carrera .................. | B60N 2/829 |

* cited by examiner

*Primary Examiner* — Philip F Gabler
(74) *Attorney, Agent, or Firm* — WPAT, PC

(57) ABSTRACT

A chair-back adjusting structure includes a first plate, a second plate, and a moving component. The first plate has a fixing plate perpendicularly installed thereon. The second plate has two fixing brackets installed thereon. Each fixing bracket defines a through hole. The moving component includes adjusting sleeves, adjusting shafts, and stop collars. The adjusting sleeves are symmetrically arranged on the second plate. Each adjusting sleeve defines therein a channel and is tapered in shape. Each stop collar is mounted around the corresponding adjusting shaft. Each adjusting shaft has one end fixed to the fixing plate and an opposite end entering and fixed in the corresponding channel through the stop collar. In use, the first plate is installed in an upper back part of a chair, and the second plate is installed in a lower back part of the chair, so that the height of the chair back can be adjusted.

6 Claims, 9 Drawing Sheets

CHAIR-BACK ADJUSTING STRUCTURE

BACKGROUND OF THE INVENTION

1. Technical Field

The present invention relates to adjusting structures, and more particularly to a chair-back adjusting structure that allows a back of a chair to be adapted to its users in terms of height.

2. Description of Related Art

Normal chairs usually have backs with fixed heights and are unadaptable to users with different body heights and body forms. This limits versatility of chairs and makes them unsatisfying in shared use. Without adjustability, chairs can discomfort users' backs and necks after long use, and adversely influence user's sitting positions, eventually undermining spinal health in long term.

It is thus clear that the known chairs without adjustability have to be improved in user comfort. Hence, there is a need for a chair-back adjusting structure that allows a chair to be adapted to users having different body heights.

SUMMARY OF THE INVENTION

The primary objective of the present invention is to address the need for adjustability of a back of a chair in height.

To achieve the objective, one embodiment of the present invention provides a chair-back adjusting structure, comprising a first plate, a second plate, and a moving component. The first plate has one side on which a fixing plate is installed. The first plate and the fixing plate are perpendicular to each other. The second plate has one side on which two fixing brackets are installed. Each of the fixing brackets defines a through hole. The moving component includes two adjusting sleeves, two adjusting shafts, and two stop collars. The adjusting sleeves are symmetrically arranged on the same side of the second plate. Each of the adjusting sleeves defines therein a channel. Each of the adjusting sleeves is tapered in shape. Each of the stop collars is mounted around the corresponding adjusting shaft. Each of the adjusting shafts has one end fixed to the fixing plate, and has an opposite end entering and fixed at any position of the channel through the corresponding stop collar.

In use, the first plate is installed in an upper back part of a chair, and the second plate is installed in a lower back part of the chair. By directly pulling the upper back part to pull the adjusting shafts upward, the height of the back of the chair can be effectively adjusted. The disclosed chair-back adjusting structure allows a chair to be adapted to users having different body heights and body forms and the resulting adjustment is reliable and stable.

DETAILED DESCRIPTION OF THE INVENTION

Figure 1:
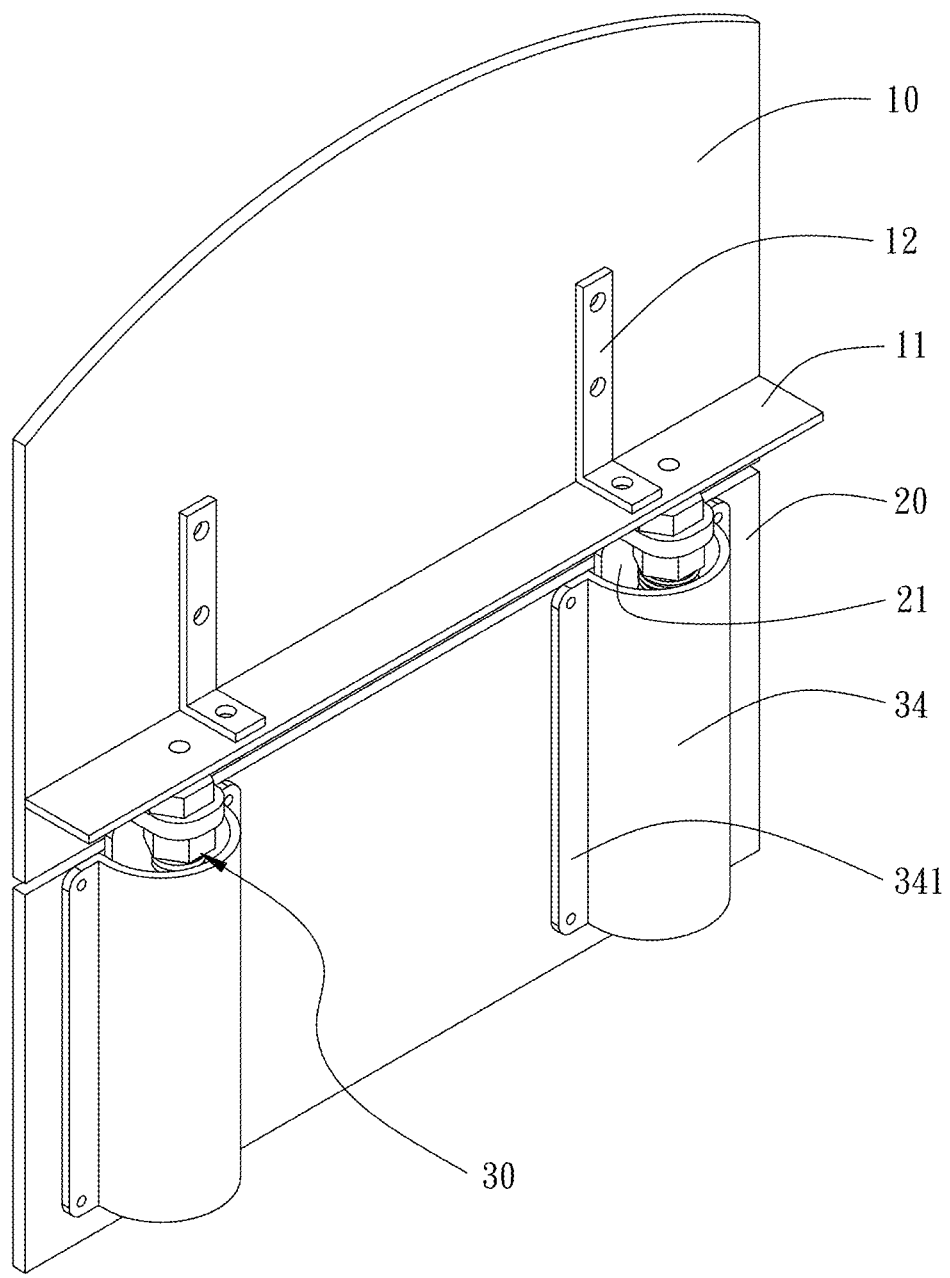
FIG. 1 is a perspective view of a chair-back adjusting structure according to the present invention.

For further illustrating the means and functions by which the present invention achieves the certain objectives, the following description, in conjunction with the accompanying drawings and preferred embodiments, is set forth as below to illustrate the implement, structure, features and effects of the subject matter of the present invention.

Referring to FIG. 1 through FIG. 9, the present invention discloses a chair-back adjusting structure, which comprises a first plate 10, a second plate 20, and a moving component 30. The first plate 10 has one side on which a fixing plate 11 is such installed that the first plate 10 and the fixing plate 11 are perpendicular to each other. The second plate 20 has one side on which two fixing brackets 21 are installed, and each of the fixing brackets 21 has a through hole 211. The moving component 30 comprises two adjusting sleeves 31, two adjusting shafts 32, and two stop collars 33. The adjusting sleeves 31 are symmetrically arranged on the same side of the second plate 20. Each of the adjusting sleeves 31 defines therein a channel 311, is tapered in shape. Each of the stop collars 33 is mounted around the corresponding adjusting shaft 32, and is in the form of a C-shaped ring, a silicone tube, or a rubber washer. Each of the adjusting shafts 32 has one end fixed to the fixing plate 11 and has an opposite end entering and fixed at any position of the corresponding channel 311 through the corresponding stop collar 33.

Figure 2:
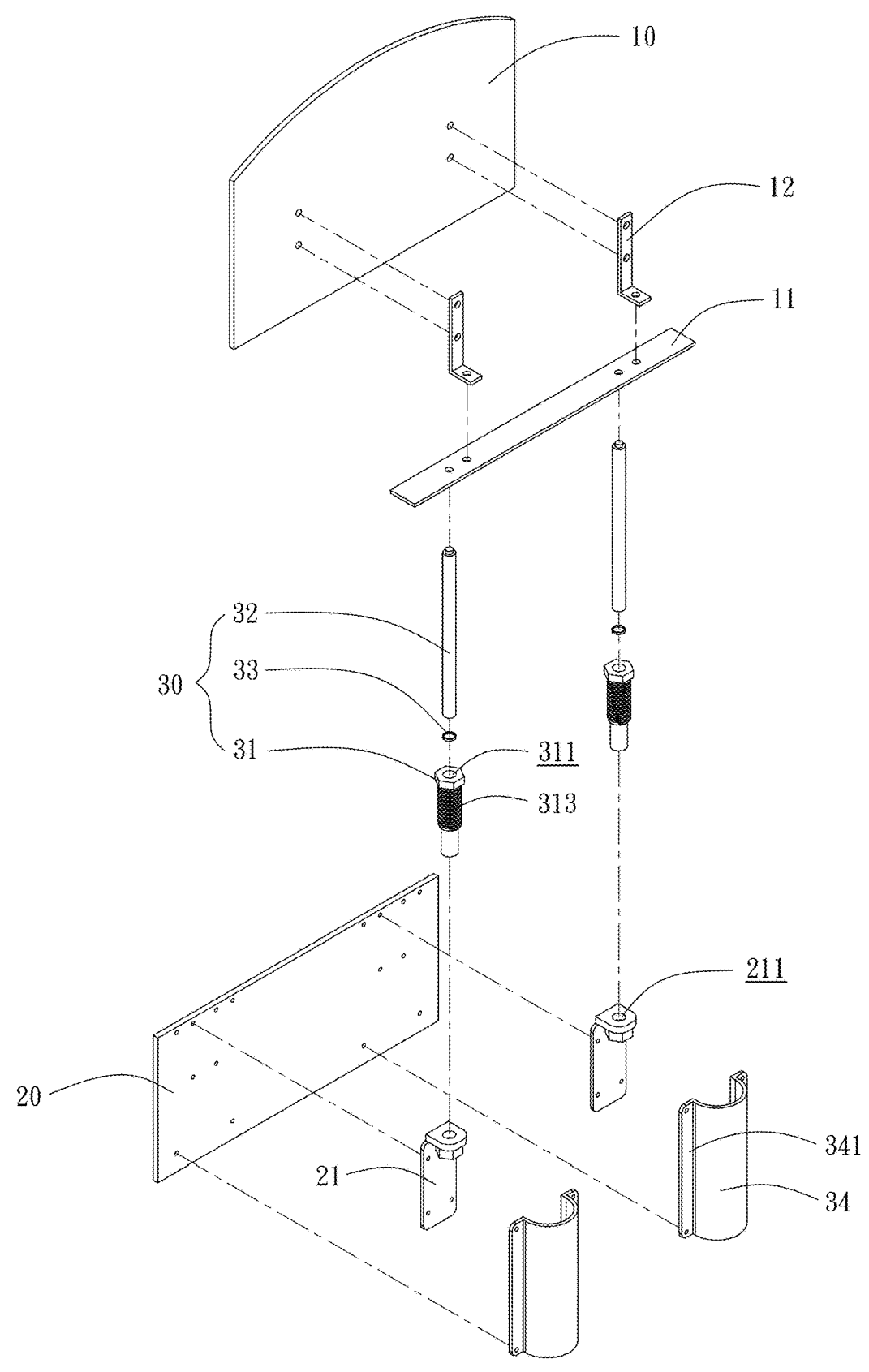
FIG. 2 is an exploded view of the chair-back adjusting structure of FIG. 1.

Referring to FIG. 1 and FIG. 2, the disclosed chair-back adjusting structure further comprises two L-shaped connecting members 12. Each of the L-shaped connecting members 12 has its two sides fixed to the first plate 10 and the fixing plate 11, respectively. The L-shaped connecting members 12 serve to strengthen the combination between the first plate 10 and the fixing plate 11. Instead of provision of the L-shaped connecting members 12, adhesion may be alternatively used to facilitate the combination between the first plate 10 and the fixing plate 11.

Still referring to FIG. 1 and FIG. 2, the disclosed chair-back adjusting structure further comprises two covers 34. Each of the covers 34 is in a U-like shape and has two extended, opposite edges each formed as a fixing segment 341. The covers 34 are to cover the moving component 30, with the fixing segments 341 fixed to the second plate 20. The covers 34 serve to protect the moving component 30 from external damage or operational interference. In particular, the U-shaped covers 34 prevent dust, debris, or other foreign objects from entering and hindering the moving component 30 from its normal operation. The fixing segments 341 allow the covers 34 to be stably installed on the second plate 20, thereby ensuring that the covers 34 will not move or come off when being impacted and protect the moving component 30 reliably.

Figure 3:
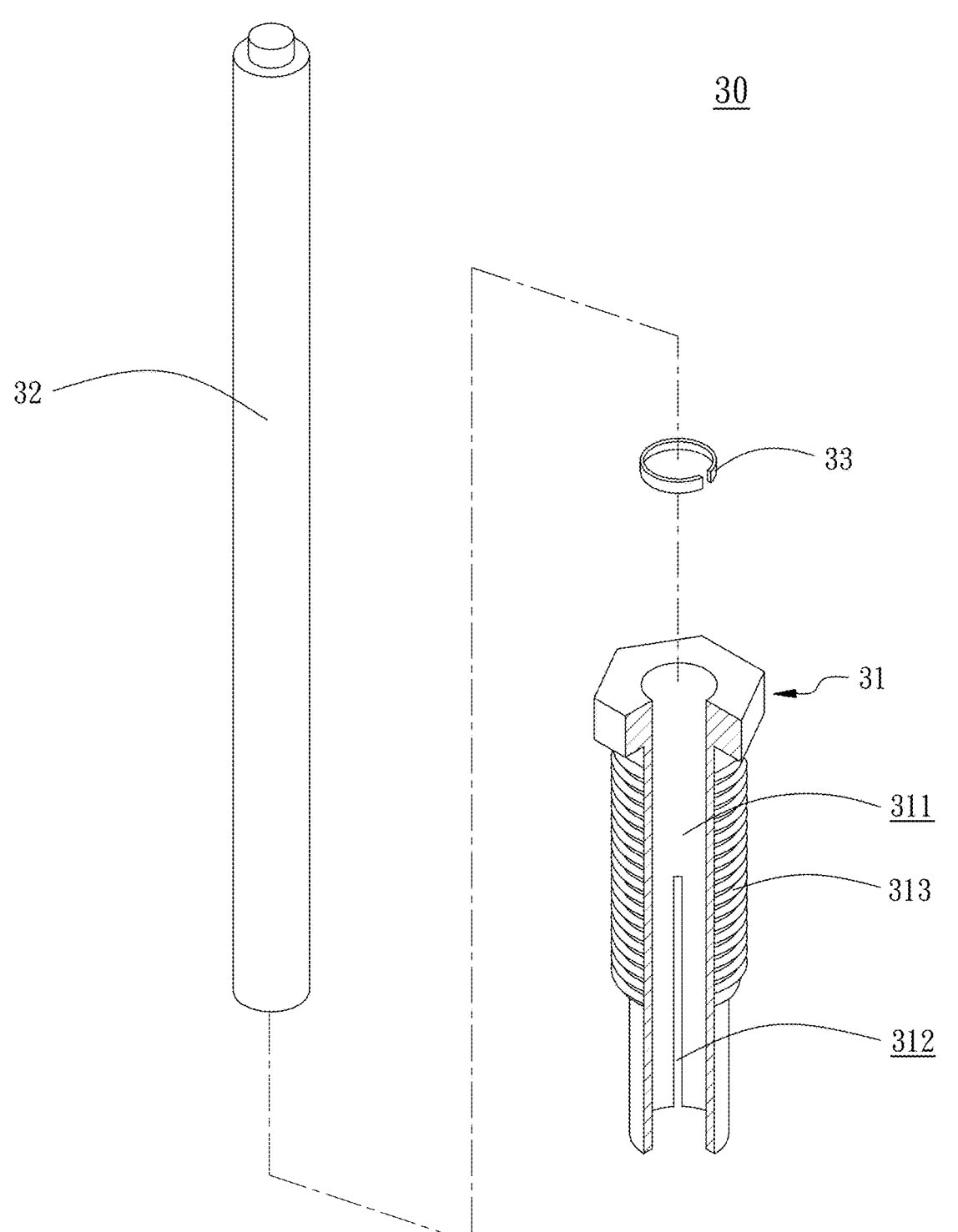
FIG. 3 is an exploded view of a moving component in the present invention.

Referring to FIG. 3 along with FIG. 2, each of the adjusting sleeves 31 has an axially extending slit 312. The slit 312 has a length that is smaller than a half of the total length of the adjusting sleeve 31. The length of the slit 312 is designed with the limit to ensure that the existence of the slit 312 will not weaken the overall strength of the adjusting sleeve 31 and to minimize the risk that the adjusting sleeve 31 breaks or warps under external force, yet the slit 312 shall be long enough to allow the adjusting sleeve 31 to appropriately expand. When the adjusting shaft 32 is inserted into the adjusting sleeve 31, the slit 312 allows the adjusting sleeve 31 to slightly deform to better fit the stop collar 33 on the adjusting shaft 32, thereby positioning the adjusting shaft 32 firmly.

Figure 4:
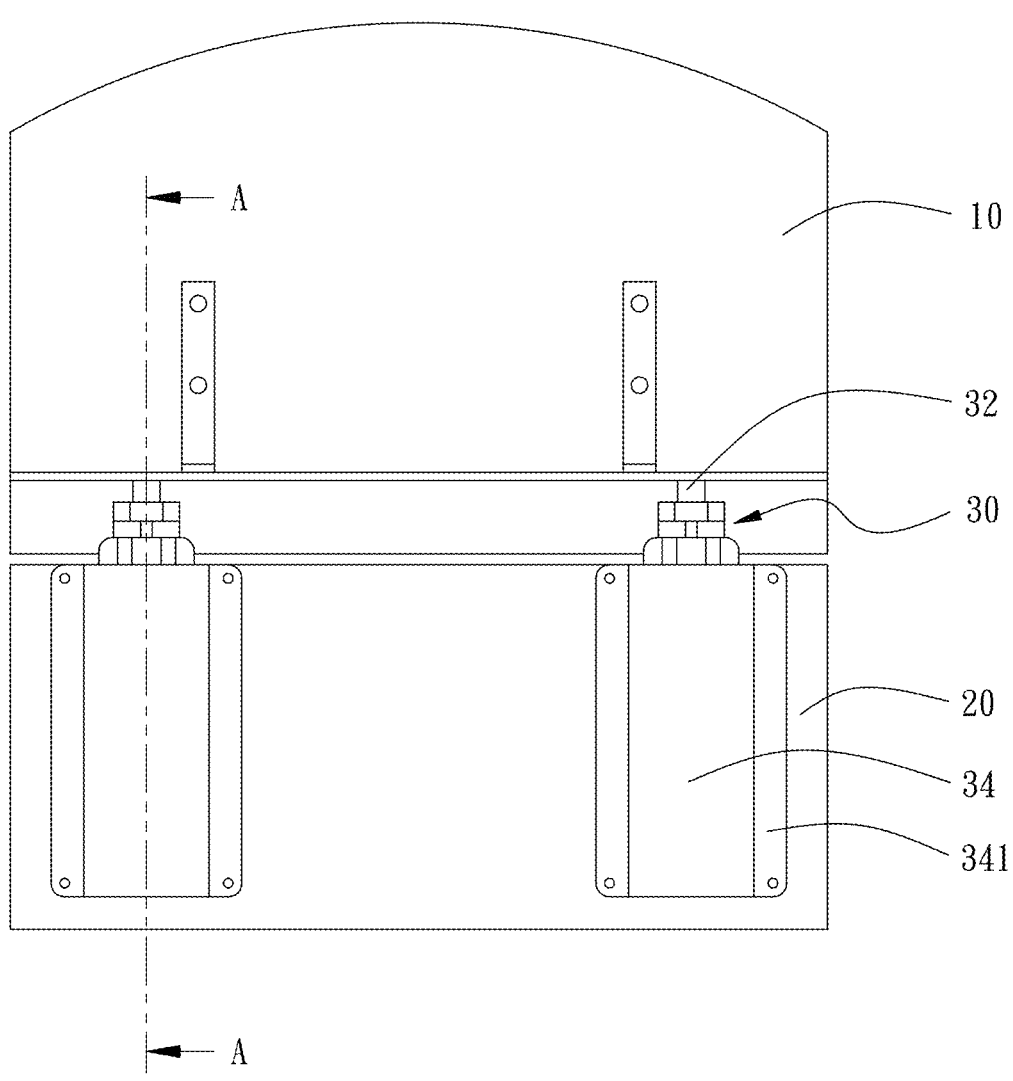
FIG. 4 is a front view of the chair-back adjusting structure according to the present invention.
Figure 5:
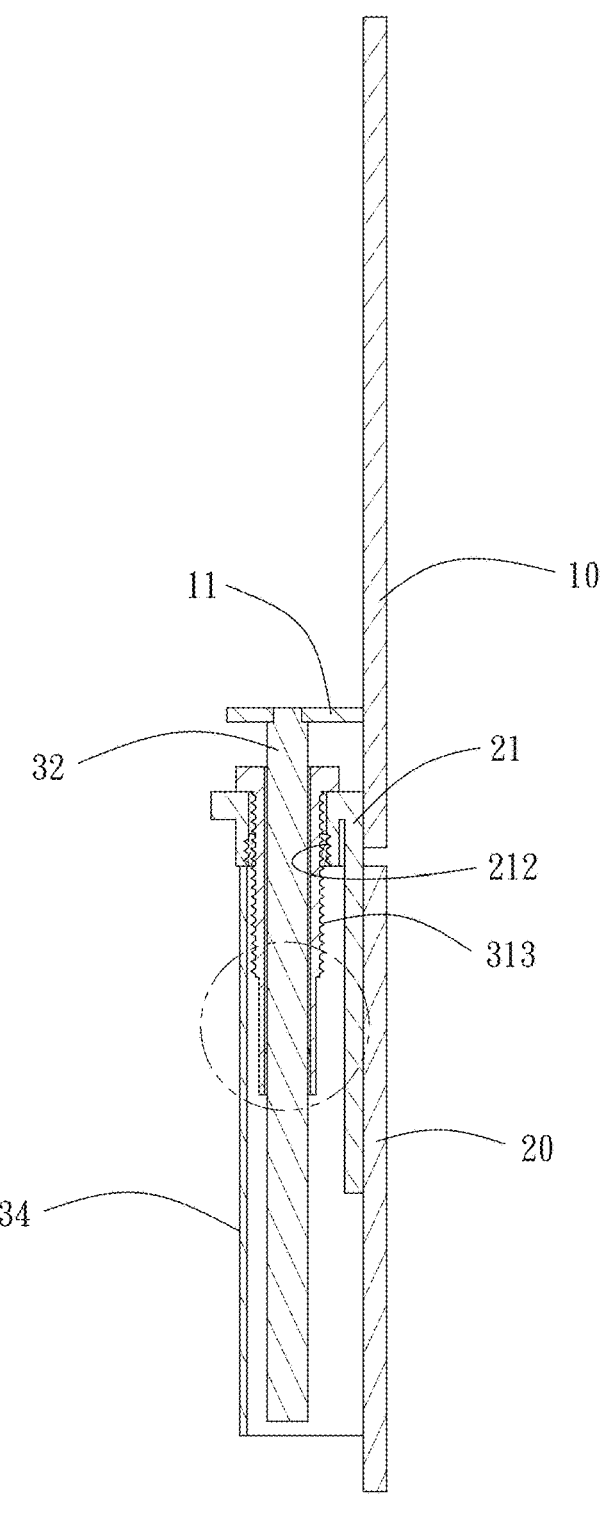
FIG. 5 is a cross-sectional view taken along line A-A in FIG. 4.

Referring to FIG. 4 and FIG. 5 along with FIG. 2, the wall defining the through hole 211 of the second plate 20 is formed with internal threads 212 and the adjusting sleeve 31 has its outer surface formed with external threads 313, so that each of the adjusting sleeves 31 can be screwed into the corresponding fixing bracket 21.

Figure 6:
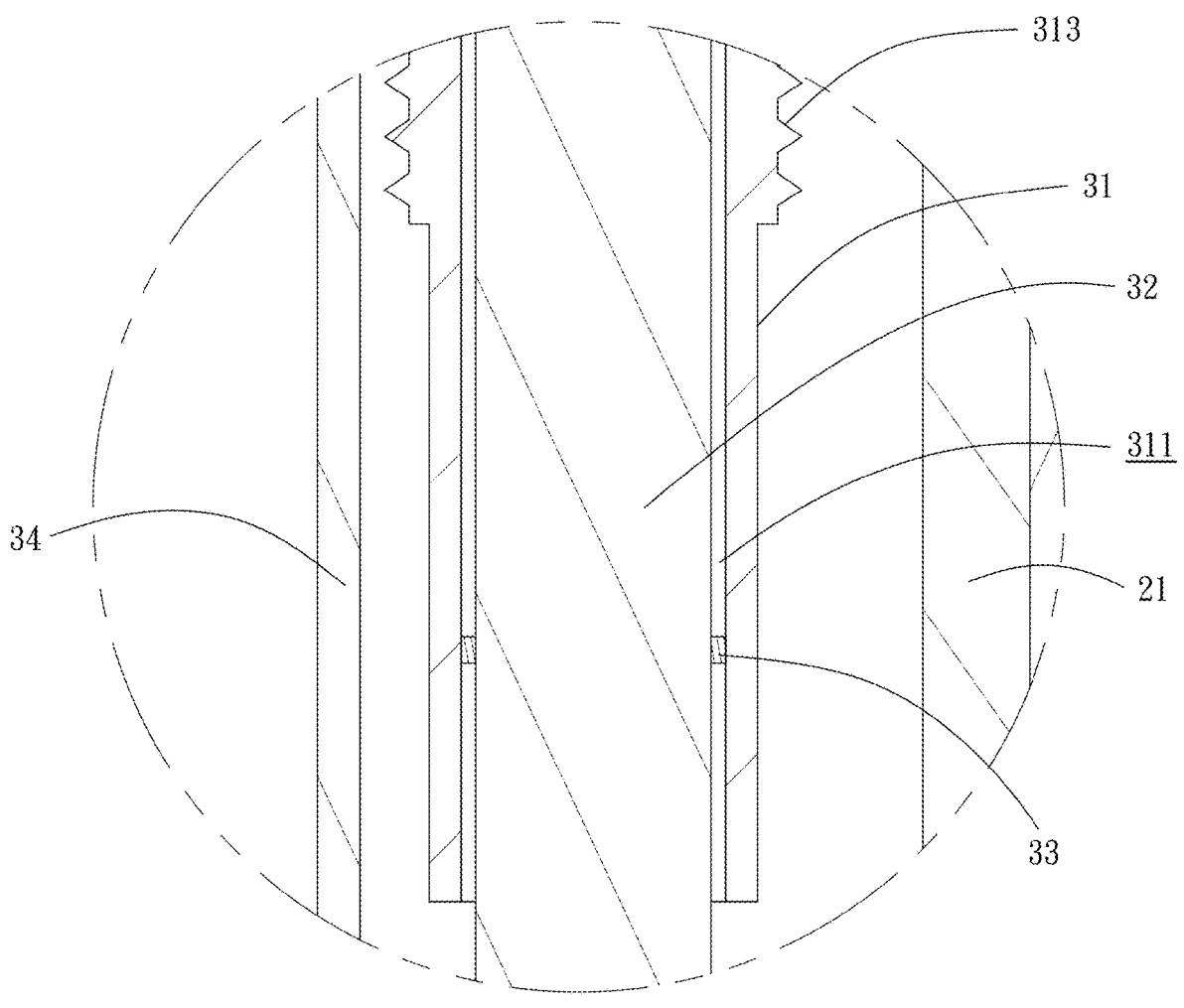
FIG. 6 is a partial, zoomed-in view of FIG. 5.
Figure 7:
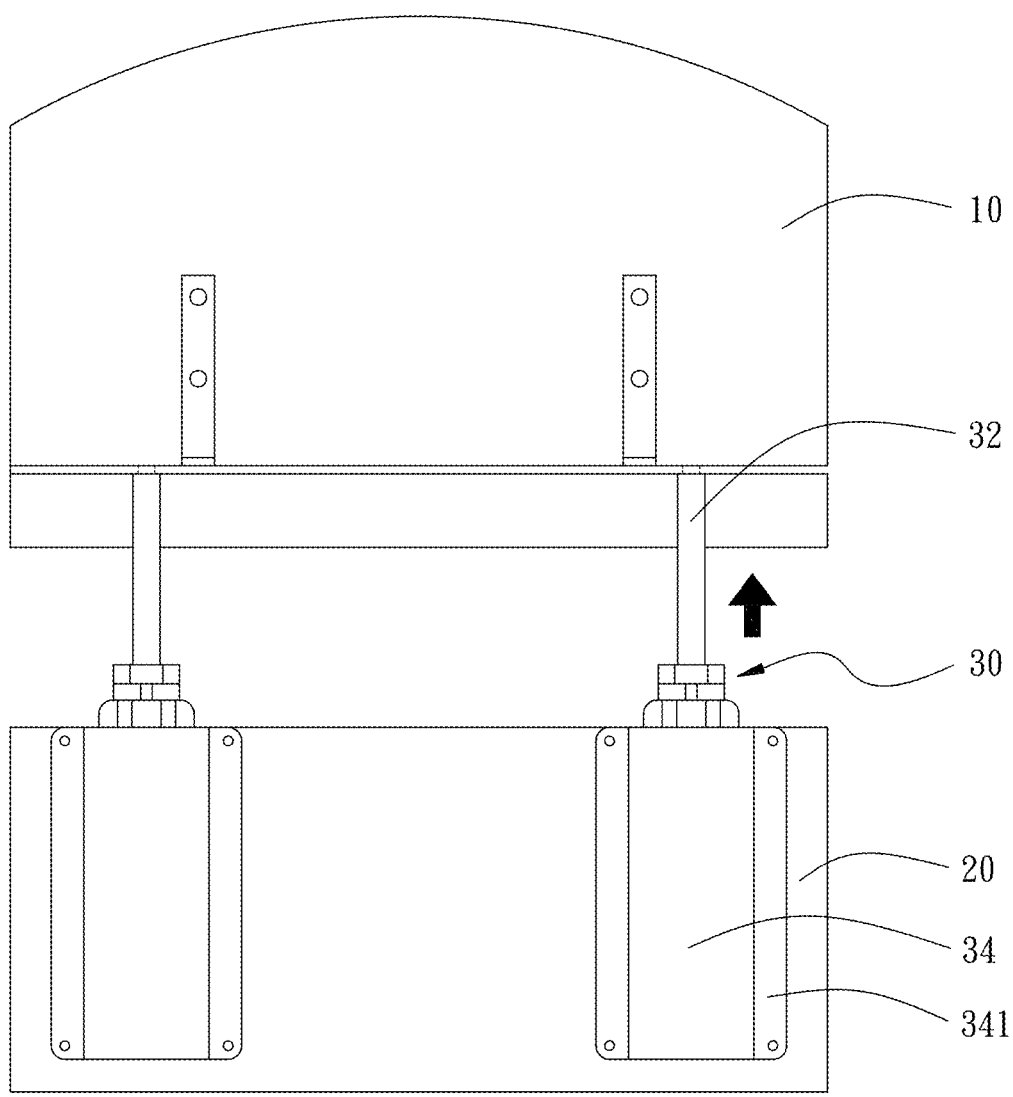
FIG. 7 illustrates adjustment implemented between the first plate and the second plate for changing the relative distance therebetween.

Referring to FIG. 6 and FIG. 7 along with FIG. 2 and FIG. 3, since the adjusting sleeve 31 is tapered in shape, the space in the adjusting sleeve 31 is narrowed from one end to the other end, and such a design structurally increases friction. Specifically, with the stop collar 33 mounted around the adjusting shaft 32, when the adjusting shaft 32 shifts in the adjusting sleeve 31, the stop collar 33 is driven to move and fits the inner wall of the adjusting sleeve 31 tighter and tighter. The increased friction between the inner wall of the adjusting sleeve 31 and the stop collar 33 positions the adjusting shaft 32 with respect to the adjusting sleeve 31 firmly, thereby preventing the adjusting shaft 32 from unintentional displacement. After pulled or pushed to the height accommodating different body heights of users, the adjusting shafts 32 can be stably positioned at the arbitrarily set height without unintentional slide and displacement until they receive an external force for adjustment again. This prevents any uncontrolled change in height.

Figure 8:
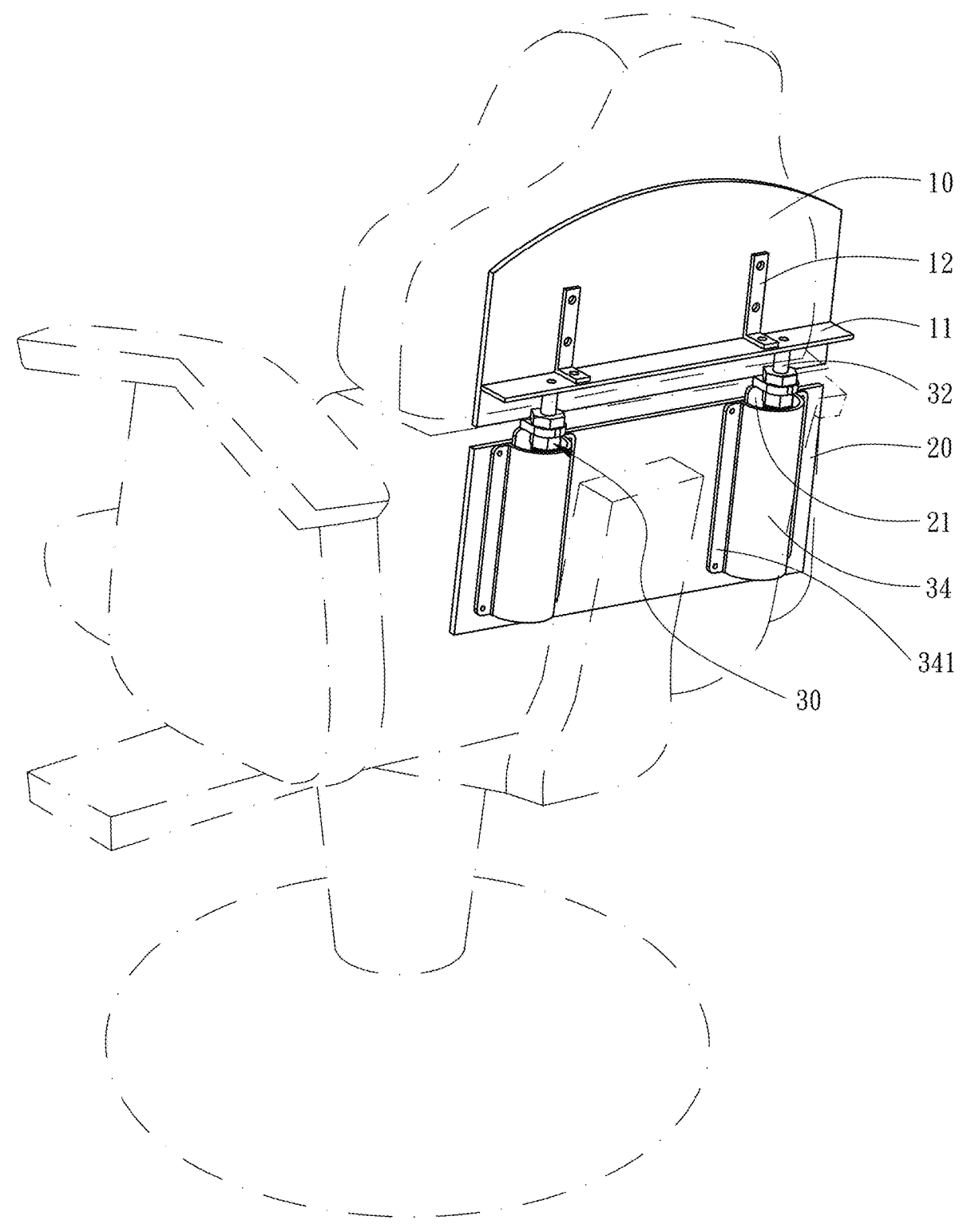
FIG. 8 is an applied view of the chair-back adjusting structure, showing it applied to a chair.
Figure 9:
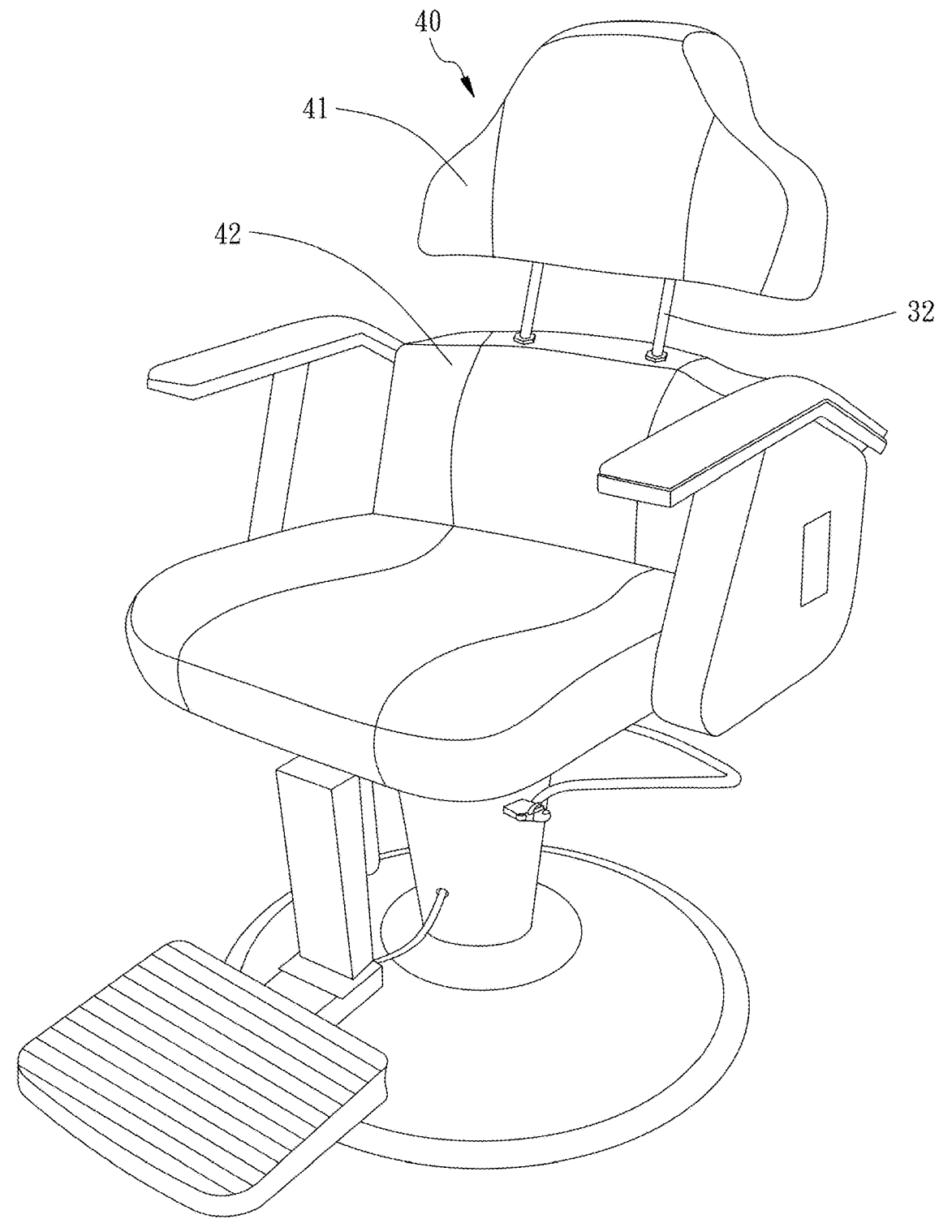
FIG. 9 is a perspective view of the chair equipped with the chair-back adjusting structure of the present invention.

Referring to FIG. 8 and FIG. 9 along with FIG. 1 and FIG. 2, in the shown application scenario of the present invention, for a chair 40 having a back split into an upper back part 41 and a lower back part 42, the first plate 10 is installed in the upper back part 41 and the second plate 20 is installed in the lower back part 42. To adjust the height of the adjusting shafts 32, a user may directly pull the upper back part 41 upward or push it downward. This drives the adjusting shafts 32 to move upward or downward and makes the inner walls of the adjusting sleeves 31 abut tightly against the outer surfaces of the stop collars 33, thereby ensuring that the adjusting shafts 32 are firmly positioned without unintentional slide and displacement. The stable positioning fixes the back of the chair at an arbitrarily set height and prevents any uncontrolled change in height.

With the configurations described above, the present invention provides the following advantages:

1. The tapered adjusting sleeves 31 provide reliable positioning. Since the adjusting sleeves 31 are tapered in shape, when the adjusting shafts 32 shift in the adjusting sleeves 31, the stop collars 33 are driven to move and fit the inner walls of the adjusting sleeves 31 tighter and tighter, thereby providing reliable positioning.

2. The slits 312 on the adjusting sleeves 31 further enhance positioning. The slits 312 axially extending along the adjusting sleeves 31 allow the adjusting sleeves 31 to slightly deform, so that when the adjusting shafts 32 shift in the adjusting sleeves 31, the adjusting sleeves 31 fit around the stop collars 33 on the adjusting shafts 32 tighter and tighter, thereby further enhancing positioning.

3. With the disclosed chair-back adjusting structure, a back of a chair can be easily adjusted in height. The structure of the present invention allows a user to adjust the height of a back of a chair according to his/her needs by simply pulling up or pushing down the adjusting shafts 32, without complicated operation.

The present invention has been described with reference to the preferred embodiments and it is understood that the embodiments are not intended to limit the scope of the present invention. Moreover, as the contents disclosed herein should be readily understood and can be implemented by a person skilled in the art, all equivalent changes or modifications which do not depart from the concept of the present invention should be encompassed by the appended claims.

What is claimed is:

1. A chair-back adjusting structure, comprising:
a first plate, having one side on which a fixing plate is installed, wherein the first plate and the fixing plate are perpendicular to each other;
a second plate, having one side on which two fixing brackets are installed, wherein each of the fixing brackets defines a through hole; and
a moving component, including two adjusting sleeves, two adjusting shafts, and two stop collars, the adjusting sleeves being symmetrically arranged on the same side of the second plate, each of the adjusting sleeves defining therein a channel, each of the adjusting sleeves being tapered in shape, each of the stop collars being mounted around the corresponding adjusting shaft, and each of the adjusting shafts having one end fixed to the fixing plate while having an opposite end entering and fixed at any position of the corresponding channel through the corresponding stop collar.

2. The chair-back adjusting structure of claim 1, wherein each of the adjusting sleeves has an axially extending slit.

3. The chair-back adjusting structure of claim 2, wherein the slit has a length that is smaller than a half of an overall length of the adjusting sleeve.

4. The chair-back adjusting structure of claim 3, wherein each of the through holes of the second plate is defined by a wall formed with internal threads, and each of the adjusting sleeves having an outer wall formed with external threads, so that the adjusting sleeves are able to be screwed into the fixing brackets.

5. The chair-back adjusting structure of claim 4, further comprising two L-shaped connecting members, wherein each of the L-shaped connecting members has two sides fixed to the first plate and the fixing plate, respectively.

6. The chair-back adjusting structure of claim 5, further comprising two covers, wherein each of the covers is in a U-like shape and has two extended, opposite edges each formed as a fixing segment, so that when the covers cover the moving component, the fixing segments are fixed to the second plate.

* * * * *